United States Patent
Poppe et al.

[15] 3,696,665

[45] Oct. 10, 1972

[54] CONTACT ANGLE MEASUREMENT OF PLASTIC SURFACES

[72] Inventors: Wassily Poppe, Lombard, Ill.; Habet M. Khelghatian, Springfield, Pa.

[73] Assignee: Standard Oil Company, Chicago, Ill.

[22] Filed: March 1, 1971

[21] Appl. No.: 119,877

[52] U.S. Cl. .................................. 73/104, 73/150
[51] Int. Cl. ............................................. G01h 19/08
[58] Field of Search .................. 73/432 R, 150, 104

[56] References Cited

UNITED STATES PATENTS

| | | | |
|---|---|---|---|
| 2,829,517 | 4/1958 | Kushner | 73/150 |
| 3,535,043 | 10/1970 | Hong | 73/64.4 |
| 3,558,444 | 1/1971 | Fitzpatrick | 73/104 X |
| 3,580,066 | 5/1971 | Pliskin | 73/104 X |

*Primary Examiner*—S. Clement Swisher
*Attorney*—Arthur G. Gilkes, William T. McClain and John C. Martin, Jr.

[57] ABSTRACT

A non-destructive test is provided for determining the ability of a metal coating to adhere to the plastic substrate of a metallized plastic article comprising determining the difference between two separate contact angle values, the first being obtained by measuring the contact angle formed by a drop of liquid resting on a specimen plastic substrate prior to etching said substrate and the second being obtained by measuring the contact angle formed by a drop of liquid resting on an etched plastic substrate. Contact angle values are easily measurable parameters which indicate platability and therefore are valuable in the electroplating of plastics.

14 Claims, No Drawings

CONTACT ANGLE MEASUREMENT OF PLASTIC SURFACES

BACKGROUND OF THE INVENTION

This invention relates to a method for determining, prior to metallizing, whether a metallic coating will firmly adhere to the surface of a plastic article. It is well known that metallic coatings fail to firmly adhere to substrates of non-conductive articles in the absence of modification of either the non-conductive substrate or the metallizing process. Many processes have been described in literature in an attempt to solve this problem. Metallized plastic articles wherein the deposited metal is firmly bonded to the substrate are very desirable and may be used as substitutes for various construction materials. Good adhesion between the metal coating and the substrate improves various physical properties such as abrasion resistance, impact strength and temperature deflection.

Analytical methods are available that determine with accuracy the adhesive strength or bond strength between a plated metal and the plastic substrate. In addition there are also specific tests which will indicate the presence of strains and stresses in a molded part. For instance, highly stressed areas in molded acrylonitrile-butadiene-styrene (ABS) plastic articles can be detected by immersing the suspect articles in glacial acetic acid for several minutes and thereafter observing the articles. The areas of substantial internal stress will crack while in the acid. However, this test and similar tests are destructive in that the molded article may not thereafter be commercially used for its original intended purpose.

Adhesion of a metallic coating to a plastic surface may be measured by a variety of qualitative tests. These include so-called bend and scratch tests. Other evaluation methods include a thermocycling test which measures the resistance of the plated metal to environmental temperature fluctuation and another evaluation procedure is the environmental corrosion test. However, these and other similar procedures that evaluate the bond strength of a plated metal to a plastic substrate may not be performed until the article is plated. Thus, a plated plastic article failing to meet the minimum adhesion requirement must be discarded. This results not only in waste of a molded plastic article, but also the valuable plating chemicals have not been successfully utilized. Furthermore, most of these evaluation techniques result in destruction of the plated metal coating on the plastic article. Therefore, a procedure enabling prediction of the capability of a subsequently applied metal coating to adhere to a plastic substrate would be a valuable analytical tool.

SUMMARY OF THE INVENTION

It is an object of this invention to determine, prior to metallizing, whether the surface of a plastic article may be successfully metallized to obtain a firm bond between the plated metal and the plastic surface. It is another object of this invention to achieve substantial cost reduction in the metallizing of plastic articles by determining in advance of the plating operation whether or not the surface of the plastic article is sufficiently conditioned to enable a subsequently applied metallic coating to firmly adhere to the plastic surface.

These and other objects of the invention may be accomplished by obtaining a contact angle measurement formed by a drop of liquid resting on the surface of the plastic article conditioned by acid etching and then comparing the recorded contact angle measurement with the value obtained prior to etching the plastic article. An increase in value after etching suggests good adhesion of a subsequently plated substrate.

Although several methods are available for measurement of contact angles, the most widely accepted method is to measure the angle of a drop of liquid resting on a solid surface with the aid of a microscope having an angle-measuring eyepiece. A convenient instrument developed for this work is called a goniometer. It consists of a small telescope having an achromatic objective and a Ransden eyepiece. Two cross hairs, each molded as a diameter of the telescope, were so supported that each could be independently rotated in a plane perpendicular to the telescope axis. The goniometer was constructed so that, as one cross hair was rotated, a 180° protractor rotated rapidly with it in a plane at right angles to the telescope axis, the protractor being adjusted with the zero degree mark on the scale parallel to the cross hair. As the other cross hair rotated, a pointer, rigidly attached and parallel to it also rotated about the telescope axis. A drop of liquid whose contact angle is to be measured is placed on the surface of the plastic article and the goniometer is adjusted until the images of the drop and the two cross hairs are in focus. Then the protractor scale is revolved until its cross hair is parallel to the surface on which the drop rested and the other cross hair is adjusted until it is tangent to the drop at the point of contact with the surface of the plastic article. The angle on the protractor indicated by the pointer is considered the contact angle.

DESCRIPTION OF THE INVENTION

Suitable synthetic plastic materials useful as electroplatable substrates include vinyl aromatic polymers such as polystyrene, acrylonitrile-butadiene-styrene copolymers (ABS), styrene-acrylonitrile polymers, and rubber-containing polystyrene; polyolefins such as polypropylene and particularly normally solid, substantially crystalline polypropylene, polyethylene, poly (4-methyl-pentene-1), poly (3-methylbutene-1), ethylene-propylene copolymers (including random amorphous ethylene-propylene copolymers as well as solid, substantially crystalline block copolymers of propylene and ethylene), polysulfones and polyphenylene oxides. The term polyolefins as used herein is intended to include copolymers of aliphatic hydrocarbon monomers with copolymerizable monomers in which said monomers comprise a minor proportion of the copolymer. The synthetic, organic polymeric composition used to prepare the solid substrate may contain inorganic fillers such as talc, titanium dioxide and alkaline earth salts which are frequently added to improve the rigidity of the shaped material. In addition, the plastic may contain other additives normally added such as heat and light stabilizers, mold release agents and adhesion-promoting modifiers, and the like.

The modified synthetic polymeric materials are shaped into the article desired by conventional means inclusive of which are compression molding and injection molding.

Although various processes have been developed for plating non-conductive surfaces and particularly the surface of plastic articles, similar steps are usually employed. Electroplating of plastic articles is generally performed by sequentially conditioning (etching), sensitizing, activating, applying electroless plating and thereafter electroplating a finish metal on the electroless plated layer. The conditioning step is accomplished by immersing the surface of the article in a strong acid bath containing at least one concentrated mineral acid and a hexavalent chromium compound such as chromic trioxide or an alkali-metal dichromate. Thereafter the etched surface is sensitized with a readily oxidizable tin salt solution such as a stannous chloride solution and then the surface is activated by treatment with an aqueous solution of a noble metal salt such as palladium chloride. Now the activated surface is ready for electroless plating with a metal salt of copper, nickel or cobalt. In addition to the metal salt, such as copper sulfate, a reducing agent such as formaldehyde or the like is usually employed. Finally the electroless plated surface is conventionally electroplated with copper, nickel and/or chromium.

After the electroplating process, the bond strength (adhesion) of the plated metal to the plastic substrate is measured by the pull test. The test is performed by making two parallel cuts into the plated metal coating one-half inch apart and then making an additional vertical cut to form a tab. One end of the resulting tab is raised sufficiently to allow gripping by tensile testing machine, then the specimen is placed into a tensile rig and the tab is pulled vertically from the surface. The force required to pull the tab is measured as the bond strength. For most applications a bond strength in excess of 6 to 10 lbs/in. is adequate. However, if a plated article is intended to be used under conditions wherein it may be subjected to mechanical shock or extreme temperature changes, then bond strength up to 25 lbs/in. or more may be desirable.

For purposes of illustrating the invention the following examples are presented wherein all parts and percentages are by weight unless otherwise indicated.

EXAMPLE

To 100 parts of crystalline polypropylene having a flow rate of 3.4 (ASTM-D-1238-62 T) is added 0.5 parts of t-octylphenoxy-polyethoxy-ethanol having an average number of 9 to 10 ethoxy groups, 0.25 parts of ditertiary butyl-4 methylphenol, 3.5 parts of limed wood rosin containing about 4.5 percent ash as CaO, 0.5 parts of dilauryl thiodipropionate, 0.2 parts of calcium stearate and 5 parts of titanium dioxide. The polypropylene composition was melt blended in an extruder to uniformly blend the additives and thereafter the composition was then molded into plaques having the dimensions 2 × 2.5 × 0.125 inches.

Another series of plaques were molded from an acrylonitrile-butadiene-styrene copolymer (ABS) commercially available under the tradename Cycolac 3510.

The preparation of the surface of the articles for contact angle measurement is accomplished by washing the articles for 10 minutes in warm tap water (50° to 60°C.) and thereafter rinsing the articles with distilled water. Then the articles are dried for 30 minutes in the oven at 90°C. and thereafter cooled for at least 1 hour in a dessicator.

The contact angle is measured with a Naval Research Laboratory goniometer, Model A100 available from Ramie-Hart, Inc.

In accordance with previously described procedure for measuring contact angles, a drop of water is placed on the surface of the plastic article and the contact angle of the drop of water resting on the solid surface of the plastic article is measure. On another plaque that is being prepared for measuring contact articles a drop of mercury is placed on a surface of the plastic article and again the contact angle is measured. The contact angle values are shown in Table I below under the heading "Before" which indicates that the value was obtained on an unetched surface of the plastic article prior to immersing the plastic article in a conditioning (etching) bath.

Several of the polypropylene (PP) plaques and ABS plaques were immersed in the conditioning bath designated Conditioner A in Table I and other plaques were immersed in Conditioner B. Both polypropylene and ABS plaques were conditioned at bath temperatures of 120°, 140°, 170° and 190°F.

Each of the plaques treated by a conditioning bath were prepared for contact angle measurement by washing with water and drying in an oven according to the previously described procedure. Thereafter the contact angle of a drop of water and a drop of mercury resting on the surface were measured with the aforementioned goniometer. The contact angle values obtained are shown in Table I under "After" which indicates the measurement was made following the conditioning (etching) step.

Each of the plaques previously immersed in the conditioning bath were treated to an electroplating process by consecutively immersing the plaques in a stannous chloride sensitizer solution containing per liter of solution 10 g. of $SnCl_2$ and 40 ml of HCl at ambient temperatures for two minutes; in an activator solution containing per gallon of solution 1 g. of palladium chloride and 10 ml of HCl for two minutes at ambient temperatures; and in an electroless copper plating solution containing per liter of solution 29 g. of copper sulfate, 140 g. of Rochelle Salt, 40 g. of sodium hydroxide and 166 g. of formaldehyde (37 percent solution) at a temperature of 70°C. for a period sufficient to obtain a continuous coating capable of conducting electricity. Between each of the immersions described, the plaque is thoroughly rinsed with distilled water. The electroless plated plaque was washed with water and electroplated with copper for about 20 minutes at a current density of approximately 30 amps/sq.ft., resulting in about a 1 mil coating of copper on the plaque.

Although bond strength (adhesion) of a metallic coating to a solid substrate may be measured by various tests, it is preferably measured by the previously described pull test. The bond strength (adhesion) values obtained from the electroplated plaques are shown in Table I under the heading "Adhesion."

Table I also indicates percent weight (% wt.) loss, however, several specimens gained weight and the gain is indicated by a "+" under the percent weight loss column. This value is derived by measuring the weight difference after immersing the plaque in a conditioning bath compared with the weight of the plaque before the conditioning bath. Normally it would be expected that a significant weight loss would indicate a substrate suitable for electroplating to obtain good adhesion between a metal coating and the plastic substrate. However, an examination of the weight loss values in Table I readily indicates that there is little, if any, correlation between the adhesion values and the percent weight loss. Therefore the percent weight loss, a parameter that would be expected to predict whether or not there was a satisfactory etch, is not a reliable indicator for predicting the platability of an etched plastic surface.

Table I illustrates that where satisfactory adhesion values were obtained, there was a substantial increase in the contact angle measurement after the etching bath treatment. In predicting the platability of ABS copolymer a contact angle of a drop of mercury resting on the surface of ABS provided a more reliable contact angle value than did the value obtained from a drop of water resting on the surface of ABS copolymer.

The contact angle measurements obtained by determining the contact angle of a drop of liquid resting on a solid surface are particularly useful in determining the ability of an etched solid surface (i.e., a surface treated in a conditioning bath) to firmly adhere to a metal coating. In particular the contact angle measurement is valuable in an electroplating operation to determine whether a solid surface is suitable for further treatment in an electroplating process following the conditioning bath.

In the following Table I Conditioner B is a bath of 55 percent sulfuric acid (percent concentration), 10 percent potassium dichromate and 35 percent water. Conditioner A represents a bath comprising 40 percent by weight of sulfuric acid (96 percent concentration), 39.5 percent phosphoric acid (85 percent concentration), 3 percent chromium trioxide, and 17.5 percent water and 18 g. per 500 ml of an additive consisting of 64 percent by weight of chromium trioxide and 36 percent of sodium hydrogen sulfate.

Although the aforegoing data may suggest that high contact angle always result in high adhesion values regardless of the method of treating the substrate, the data presented in Table II indicate the selectivity of this invention. Table II illustrates contact angle measurements both "Before" and "After" vapor blasting the surface of a plastic article at room temperature with 5,000 grit. Although significant increase in contact angle occurs, no measurable adhesion is obtained following electroplating.

TABLE II

Vapor Blasting

| | Liquid | before | after | %/wt. Loss | Adhesion |
|---|---|---|---|---|---|
| Polypropylene | water | 85.3 | 110.3 | +.12 | 0 |
| | mercury | 131.5 | 158.0 | | |
| ABS Copolymer | water | 66.8 | 90.0 | .10 | 0 |
| | mercury | 123.0 | | | |

We claim:

1. A process for determining the ability of a plated metal coating to adhere to the surface of a normally solid plastic substrate comprising (a) obtaining a measurement of the contact angle formed by a drop of liquid resting on the surface of said substrate wherein said measurement is performed prior to immersing said substrate in an acid etching bath, (b) obtaining a second contact angle measurement of an etched substrate and thereafter (c) calculating the difference between the measurements obtained from (a) and (b).

2. A process according to claim 1 wherein said liquid is water.

3. A process according to claim 1 wherein said liquid is mercury.

4. A process according to claim 1 wherein said

TABLE I

| | | \multicolumn{16}{c}{Conditioning bath temperatures} |
|---|---|---|---|---|---|---|---|---|---|---|---|---|---|---|---|---|
| | | 120° F. | | | | 140° F. | | | | 170° F. | | | | 190° F. | | | |
| | Liquid | Before | After | Percent wt. loss | Adhesion | Before | After | Percent wt. loss | Adhesion | Before | After | Percent wt. loss | Adhesion | Before | After | Percent wt. loss | Adhesion |
| Conditioner A: | | | | | | | | | | | | | | | | | |
| Polypropylene | Water | 86.0 | 80.5 | +.004 | 0 | 81.7 | 69.7 | .12 | 0 | 85.7 | 123.8 | .09 | 21–22 | 86.7 | 144.2 | .51 | 16–18 |
| | Mercury | 131.0 | 133.7 | | | 131.8 | 139.2 | | | 131.5 | 157.0 | | | 135.2 | 180.0 | | |
| ABS copolymer | Water | 69.0 | 41.5 | .19 | 5–8 | 68.0 | 25.7 | .10 | 4–6 | 71.2 | | .14 | 15–17 | 67.5 | | .52 | 12–14 |
| | Mercury | 121.2 | 133.2 | | | 126.3 | 130.2 | | | 124.2 | 161.7 | | | 124.0 | 166.0 | | |
| Conditioner B: | | | | | | | | | | | | | | | | | |
| Polypropylene | Water | 86.8 | 81.5 | +.02 | 0 | 89.3 | 69.7 | .02 | 0 | 88.0 | 120.0 | .34 | 21–23 | 85.8 | 132.3 | .61 | 14–18 |
| | Mercury | 132.2 | 136.3 | | | 132.7 | 150.3 | | | 132.3 | 156.7 | | | 130.0 | 180.0 | | |
| ABS copolymer | Water | 70.8 | 39.5 | .12 | 8–1 | 71.7 | | .13 | 8–10 | 69.8 | 22.5 | .48 | 10–12 | 69.3 | 33.8 | .61 | 9–11 |
| | Mercury | 129.2 | 130.7 | | | 130.0 | 149.3 | | | 128.7 | 157.0 | | | 128.3 | 155.0 | | |

The data in Table I illustrate the concurrence of highest contact angle values with highest adhesion values and suggest the conclusion that the contact angle measurement is a valuable parameter to predict ultimate bond strength. Generally good adhesion value can be expected if the contact angle after etching is about 20° or higher than the value before etching. It would be expected that an increase in the surface area which results following the etching bath would contribute to a decrease of the contact angle. However, the data in Table I indicate that the most desirable adhesion values correspond with the highest contact angle measurements.

plastic substrate is selected from the group consisting of polyolefins, acrylonitrile-butadiene-styrene resins, polysulfones, polyphenylene oxides and polystyrenes.

5. A process according to claim 4 wherein said polyolefin is a normally solid propylene polymer.

6. A process according to claim 4 wherein said polyolefin is a normally solid polypropylene.

7. A process according to claim 1 wherein said contact angle measurement is obtained after etching said substrate in a bath comprising sulfuric acid, a hexavalent chromium compound and water.

8. A process according to claim 1 wherein said contact angle is measured by a goniometer.

9. A process according to claim 1 wherein said liquid is selected from the group consisting of water and mercury, and said plastic substrate is selected from the group consisting of polyolefins and acrylonitrile-butadiene-styrene resins.

10. A process for determining the ability of an electroplated metal coating to adhere to the surface of a normally solid plastic substrate comprising the steps of:
   a. obtaining at least one measurement of the contact angle formed by a drop of liquid resting on the surface of said plastic substrate prior to etching the substrate;
   b. etching said substrate;
   c. obtaining at least one measurement of the contact angle formed by a drop of liquid resting on the surface of said etched plastic substrate, and
   d. calculating the difference between the measurements obtained from (a) and (c) to determine whether the measured value from (c) is a greater positive number than the measured value from (a).

11. In a process wherein a normally solid plastic substrate is metallized by an electroplating procedure, the step of calculating the difference between the contact angle measurements of said substrate obtained (a) prior to etching said substrate and (b) subsequent to etching said substrate to determine whether the measured value from (b) is a greater positive number than the measured value from (a).

12. A process according to claim 11 wherein said electroplating procedure comprises conditioning or etching, sensitizing, activating, applying electroless copper conductor and thereafter electroplating a finish metal.

13. A process according to claim 11 wherein said plastic substrate is selected from the group consisting of polyolefins and acrylonitrile-butadiene-styrene resins.

14. A process according to claim 13 wherein said polyolefin is a normally solid polypropylene.

* * * * *